United States Patent
Moriwaki

(10) Patent No.: US 9,146,343 B2
(45) Date of Patent: Sep. 29, 2015

(54) DISPLAY DEVICE, MULTI-DISPLAY SYSTEM AND METHOD FOR MANUFACTURING DISPLAY DEVICE

(75) Inventor: Hiroyuki Moriwaki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 74 days.

(21) Appl. No.: 14/002,347

(22) PCT Filed: Feb. 29, 2012

(86) PCT No.: PCT/JP2012/001382
§ 371 (c)(1),
(2), (4) Date: Aug. 29, 2013

(87) PCT Pub. No.: WO2012/120838
PCT Pub. Date: Sep. 13, 2012

(65) Prior Publication Data
US 2013/0335673 A1    Dec. 19, 2013

(30) Foreign Application Priority Data

Mar. 7, 2011  (JP) .................... 2011-048910

(51) Int. Cl.
G02F 1/1333   (2006.01)
F21V 8/00     (2006.01)
G09F 9/302    (2006.01)
G02F 1/1335   (2006.01)
B32B 37/02    (2006.01)

(52) U.S. Cl.
CPC .............. *G02B 6/0078* (2013.01); *B32B 37/02* (2013.01); *G02B 6/0086* (2013.01); *G02F 1/13336* (2013.01); *G02F 1/133524* (2013.01); *G09F 9/3026* (2013.01); *Y10T 156/10* (2015.01)

(58) Field of Classification Search
CPC .. G02B 6/0078; G02B 6/0086; Y10T 156/10; G09F 9/3026; G02F 1/13336; G02F 1/133524; B32B 37/02
USPC ....................................................... 349/58–68
See application file for complete search history.

(56) References Cited

U.S. PATENT DOCUMENTS

| 6,483,482 B1 | 11/2002 | Kim |
| 2012/0008340 A1 | 1/2012 | Tomotoshi et al. |
| 2012/0069273 A1* | 3/2012 | Watanabe ...................... 349/64 |

FOREIGN PATENT DOCUMENTS

| JP | 2001-5414 A | 1/2001 |
| JP | 2010-72522 A | 4/2010 |
| WO | 2010/106782 A1 | 9/2010 |

* cited by examiner

*Primary Examiner* — Charles Chang
(74) *Attorney, Agent, or Firm* — Chen Yoshimura LLP

(57) ABSTRACT

A display device (100) is provided with: a display panel (110); a light guide member (150) provided in a frame shape at a periphery of the display panel (110) on the viewing side, the light guide member (150) guiding the light that performs image display on the display panel (110) to outside of the display panel (110); and a transparent sheet-shaped covering member (140) laminated on the surface of the display panel (110) on the viewing side, with a portion of the covering member (140) provided in-between the light guide member (150) and the display panel (110). The light guide member (150) is bonded to the surface of the covering member (140) by an adhesive agent (151).

27 Claims, 9 Drawing Sheets (a)

(b)

DISPLAY DEVICE, MULTI-DISPLAY SYSTEM AND METHOD FOR MANUFACTURING DISPLAY DEVICE

TECHNICAL FIELD

The present invention relates to a display device, a multi-display system, and a method for manufacturing the display device. More specifically, the present invention relates to a display device for forming a multi-display system where a light guide member is provided so as to make a frame portion of the display device unobtrusive (a seam between display regions of the multi-display system), and relates to a multi-display system that the display device forms, and a method for manufacturing the display device.

BACKGROUND ART

The development of big-screen displays for use with digital signage and the like has been robust recently. In particular, attention has been focused on multi-display systems, where a plurality of narrow-frame displays are combined together to form a big screen.

When combining a plurality of displays to form this big screen, it is preferable for the seams of the displays to be hard to see. Therefore, there have been attempts to make these seams harder to see by arranging a frame-shaped light-guiding member such as a lens at the periphery of each display (Patent Document 1, for example).

RELATED ART DOCUMENT

Patent Document

Patent Document 1: Japanese Patent Application Laid-Open Publication No. 2010-72522

SUMMARY OF THE INVENTION

Problems to be Solved by the Invention

There are methods to provide a frame-shaped light guide member at the periphery of the display, such as by bonding a light guide member 450 to the surface of a display panel 410 using an adhesive agent 451 such as an ultraviolet curable resin or a thermosetting resin (see FIG. 9), or by providing on the surface of the display panel 410 a transparent member 470 integrally formed of the light guide member 450 and a covering member 440, which covers the surface of the display panel 410. This transparent member 470 is attached using an optical clear adhesive tape 471 (also called "OCA tape" below) (see FIG. 10). In FIGS. 9 and 10, the reference character 430 shows the casing of the display device.

As shown in FIG. 9, when the adhesive agent 451 is used to bond the light guide member 450 to the display panel 410, the adhesive agent may leak from the areas being bonded (part 451A in FIG. 9). However, if a polarizing plate is on the surface of the display panel 410, then using chemicals or the like to remove the leaked adhesive agent 451A leads to problems such as the chemicals causing the polarizing plate to lose polarizing function, or resulting in more time needed for removing the adhesive agent 451A.

If the OCA tape 471 is used to attach the transparent member 470 containing the light guide member 450, then there will be no leaking unlike when the adhesive agent is used, and no problems related to removal of the leaked adhesive agent. However, the bigger the display panel 410 is, the bigger the light guide member 450 will be, which makes the light guide member 450 harder to bend. Thus, as shown in FIG. 10, there is a risk of air bubbles 470A occurring between the display panel 410 and the transparent member 470.

The present invention aims at obtaining a display device where a light guide member is provided at a periphery of a display panel, the light guide member being capable of being attached without causing air bubbles between the display panel and the light guide member, and where excess adhesive agent can be easily removed even if the adhesive agent has leaked from the area to be bonded.

Means for Solving the Problems

A first aspect of the present invention to solve the above-mentioned problems is a display device, including: a display panel; a light guide member provided in a frame shape at a periphery of the display panel on a viewing side, the light guide member guiding light that performs image display on the display panel to outside of the display panel; and a transparent sheet-shaped covering member laminated above a surface of the display panel on the viewing side so as to have a portion of the covering member positioned between the light guide member and the display panel, wherein the light guide member is bonded to a surface of the covering member by an adhesive agent.

A second aspect of the present invention is the first aspect of the present invention, wherein a polarizing plate is provided on an outermost surface of the display panel on the viewing side.

A third aspect of the present invention is the first or second aspect of the present invention, wherein the covering member is laminated so as to cover an entire surface of the display panel on the viewing side.

A fourth aspect of the present invention is the first or second aspect of the present invention, wherein the covering member is laminated in the frame shape so as to cover the periphery of the display panel surface on the viewing side.

A fifth aspect of the present invention is any one of aspects one to four of the present invention, wherein the covering member is made of a material having a refractive index of 1.3 to 1.7.

A sixth aspect of the present invention is the fifth aspect of the present invention, wherein the covering member is an acrylic plate.

A seventh aspect of the present invention is any one of aspects one to five of the present invention, wherein the covering member is a touch panel sheet.

An eighth aspect of the present invention is any one of aspects one to seven of the present invention, wherein the covering member is laminated on the surface of the display panel on the viewing side by an optical clear adhesive tape.

A ninth aspect of the present invention is the eighth aspect of the present invention, wherein the optical clear adhesive tape has a refractive index of 1.3 to 1.7.

A tenth aspect of the present invention is any one of aspects one to nine of the present invention, wherein the light guide member has a plano-convex lens that has a planar surface and a convex surface, the planar surface facing the display panel.

An eleventh aspect of the present invention is any one of aspects one to ten of the present invention, wherein the adhesive agent is an ultraviolet curable resin or a thermosetting resin.

A twelfth aspect of the present invention is any one of aspects one to eleven of the present invention, wherein the display panel has a diagonal length greater than or equal to 812 mm.

A thirteenth aspect of the present invention is any one of aspects one to twelve of the present invention, wherein the display panel is a liquid crystal display panel having a liquid crystal layer provided between two substrates.

A fourteenth aspect of the present invention is a multi-display system that combines a plurality of the display devices according to any one of aspects one to thirteen of the present invention to perform a big-screen display.

A fifteenth aspect of the present invention is a method for manufacturing a display device having: a display panel; and a light guide member provided in a frame shape at a periphery of the display panel on a viewing side, the light guide member guiding light that performs image display on the display panel to outside of the display panel, the method including: laminating a transparent sheet-shaped covering member above a surface of the display panel on the viewing side so as to have a portion of the covering member positioned between the light guide member and the display panel; and bonding the light guide member to a surface of the covering member by an adhesive agent.

A sixteenth aspect of the present invention is the fifteenth aspect of the present invention, wherein a polarizing plate is provided on an outermost surface of the display panel on the viewing side.

A seventeenth aspect of the present invention is the fifteenth or sixteenth aspect of the present invention, wherein the covering member is laminated so as to cover an entire surface of the display panel on the viewing side.

An eighteenth aspect of the present invention is the fifteenth or sixteenth aspect of the present invention, wherein the covering member is laminated in the frame shape so as to cover the periphery of the display panel surface on the viewing side.

A nineteenth aspect of the present invention is any one of aspects fifteen to eighteen of the present invention, wherein the covering member is made of a material having a refractive index of 1.3 to 1.7.

A twentieth aspect of the present invention is the nineteenth aspect of the present invention, wherein the covering member is an acrylic plate.

A twenty-first aspect of the present invention is any one of aspects fifteen to nineteen of the present invention, wherein the covering member is a touch panel sheet.

A twenty-second aspect of the present invention is any one of aspects fifteen to twenty-one of the present invention, wherein the covering member is laminated on the surface of the display panel on the viewing side by an optical clear adhesive tape.

A twenty-third aspect of the present invention is the twenty-second aspect of the present invention, wherein the optical clear adhesive tape has a refractive index of 1.3 to 1.7.

A twenty-fourth aspect of the present invention is any one of aspects fifteen to twenty-three of the present invention, wherein the light guide member includes a plano-convex lens that has a planar surface and a convex surface, the planar surface facing the display panel.

The twenty-fifth aspect of the present invention is any one of aspects fifteen to twenty-four of the present invention, wherein the adhesive agent is an ultraviolet curable resin or a thermosetting resin.

A twenty-sixth aspect of the present invention is any one of aspects fifteen to twenty-five of the present invention, wherein the display panel has a diagonal length greater than or equal to 812 mm.

A twenty-seventh aspect of the present invention is any one of aspects fifteen to twenty-sixth of the present invention, wherein the display panel is a liquid crystal display panel having a liquid crystal layer provided between two substrates.

According to the first and fifteenth aspects of the present invention, the sheet-shaped covering member independent from the light guide member is laminated above a surface of the display panel on the viewing side, and thus the covering member can be attached to the display panel while being bent. As a result, the formation of air bubbles between the covering member and the display panel is suppressed, and consequently an excellent display quality can be obtained without deterioration of image quality due to the air bubbles. Furthermore, the transparent sheet-shaped covering member is laminated above a surface of the display panel on the viewing side such that a portion is provided between the light guide member and the display panel, and the light guide member is bonded to the surface of the covering member with the adhesive agent. Therefore, even if the adhesive agent attaches to areas besides those to be bonded to the light guide member and covering member, the excess adhesive agent can be easily removed, the surface of the display panel on the viewing side will not be damaged by the adhesive agent, and there will be no deterioration of display quality.

According to the second and sixteenth aspects of the present invention, a polarizing plate is provided on an outermost surface of the display panel on the viewing side, however, the light guide member is not bonded to the surface of the polarizing plate, but rather to the surface of the covering member. Therefore, even if the adhesive agent leaks out, the leaked adhesive agent can be easily removed, the properties of the polarizing plate do not change, and polarizing functionality remains intact with no deterioration caused by chemicals used for removing adhesive agents.

According to the third and seventeenth aspects of the present invention, the covering member is laminated so as to cover an entire surface of the display panel on the viewing side, so the frame-shaped light guide member can be provided at the periphery of the display panel on the viewing side without being directly bonded to the display panel.

According to a fourth and eighteenth aspects of the present invention, the covering member is laminated so as to cover the periphery of the display panel, so the frame-shaped light guide member can be provided on the periphery of the display panel on the viewing side without being directly bonded to the display panel.

According to the fifth and nineteenth aspects of the present invention, a refractive index of the covering member is 1.3 to 1.7, so the difference from a refractive index (around 1.5) of the glass and the polarizing plate that form the display panel is small, and the light refraction on the boundary of the display panel and the covering member can be lessened.

As in the sixth and twentieth aspect of the present invention, an acrylic plate with a refractive index of 1.49 is an example of a material with a refractive index of 1.3 to 1.7 to form the covering member.

According to the seventh and a twenty-first aspects of the present invention, the covering member is a touch panel sheet, so a display device with a touch panel function can be obtained.

According to the eighth and twenty-second aspects of the present invention, the sheet-shaped covering member is laminated on the surface of the display panel on the viewing side by an optical clear adhesive tape, so the covering member can be attached while suppressing the formation of air bubbles between the covering member and the display panel.

According to the ninth and twenty-third aspects of the present invention, the refractive index of the optical clear adhesive tape is 1.3 to 1.7, so the difference from the refractive index (around 1.5) of the glass or the polarizing plate that form the display panel is small, and the light refraction on the boundary of the display panel and the covering member can be lessened.

According to the tenth and twenty-fourth aspects of the present invention, the light guide member has a plano-convex lens that has a planar surface and a convex surface, the planar surface facing the display panel, so light emitted to the periphery of the display panel can be guided so as to be dispersed towards the outside of the display panel.

According to the eleventh and a twenty-fifth aspects of the present invention, the light guide member is bonded to the covering member using an ultraviolet curable resin or a thermosetting resin as the adhesive agent, so the light guide member can be provided while suppressing the occurrence of air bubbles between the light guide member and the covering member.

The display device according to any one of the first to eleventh aspects of the present invention is suitable for a large-sized display panel with a diagonal length of around 812 mm or greater, as in the twelfth aspect of the present invention. The method for manufacturing the display device according to any one of fifteenth to twenty-fifth aspects of the present invention is suitable for a large-sized display panel with a diagonal length of around 812 mm or greater, as in the twenty-sixth aspect of the present invention. As the size of the display panel increases, the size of the light guide member also increases and thus becomes harder to bend, but the display device according to any one of first to eleventh aspects of the present invention has the light guide member bonded to the surface of the covering member by using the adhesive agent, and so the occurrence of air bubbles between the light guide member and the covering member is suppressed. At such a time, the light guide member is not bonded to the surface of the display panel, but rather to the surface of the covering member, and therefore even if the adhesive agent attaches to areas besides those to be bonded to the light guide member and covering member, the excess adhesive agent can be easily removed.

According to the thirteenth and twenty-seventh aspects of the present invention, the display panel is constituted of a liquid crystal display panel, so a liquid crystal display device suitable for use with a multi-display system can be obtained in a display device where the light guide member is provided at the periphery of the display panel, the light guide member being capable of being attached without causing air bubbles between the display panel and the light guide member, and where even if the adhesive agent leaks from the area to be bonded, the excess adhesive agent can be easily removed.

According to the fourteenth aspect of the present invention, a multi-display system can be made in which the seams are hard to see, even if the image is enlarged and displayed through a plurality of display devices by combining a plurality of display devices where the light guide member is provided at a periphery of the display panel. The light guide member is capable of being attached without causing air bubbles between the display panel and the light guide member, and even if the adhesive agent leaks from the area to be bonded, the excess adhesive agent can be easily removed.

Effects of the Invention

According to the present invention, the sheet-shaped covering member independent from the light guide member is laminated above a surface of the display panel on the viewing side, and thus the covering member can be attached to the display panel while being bent. As a result, the formation of air bubbles between the covering member and the display panel is suppressed, and consequently an excellent display quality can be obtained without deterioration of image quality due to the air bubbles. The light guide member is not bonded to the surface of the display panel, but rather to the surface of the covering member with the adhesive agent, and therefore even if the adhesive agent attaches to areas besides those to be bonded to the light guide member and covering member, the excess adhesive agent can be easily removed, the surface of the display panel on the viewing side will not be damaged by the adhesive agent, and there will be no deterioration of display quality.

BRIEF DESCRIPTION OF THE DRAWINGS

FIG. 5($a$) shows a state during which a light guide member is attached, and FIG. 5($b$) shows a state after the light guide member is attached.

DETAILED DESCRIPTION OF EMBODIMENTS

Figure 1:
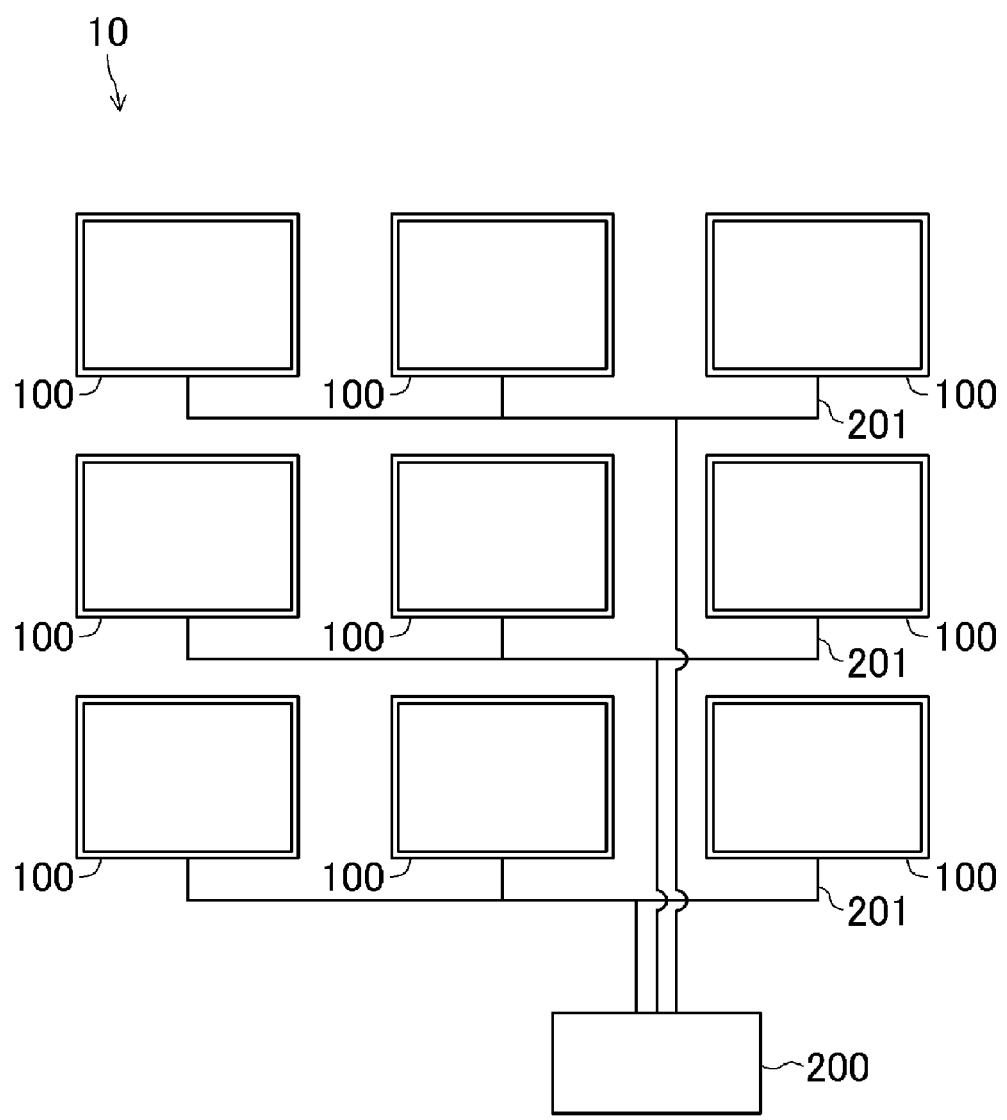
FIG. 1 is a schematic image view of an entire configuration of a multi-display system.

Embodiments of the present invention will be illustratively explained below. Not all of the embodiments necessarily need to fulfill each individual aim as described later. In the drawings, identical configurations are shown by using identical reference characters.

Embodiment 1

(Multi-Display System)

FIG. 1 is a schematic image view of a multi-display system 10. The multi-display system 10 is used for digital signage or the like that performs big-screen display, for example.

The multi-display system 10 has a plurality of display devices 100 (9 in FIG. 1) and a managing part 200. The managing part 200 communicates together with each of the display devices 100 via networks 201. The managing part 200 functions to transmit display content to each of the display devices 100, and to perform display mode switching for the display devices 100. Each of the display devices 100 may be connected in rows as shown in FIG. 1, or connected in a straight line by a GPIB interface board (General Purpose Interface Bus interface board) or the like.

Figure 2:
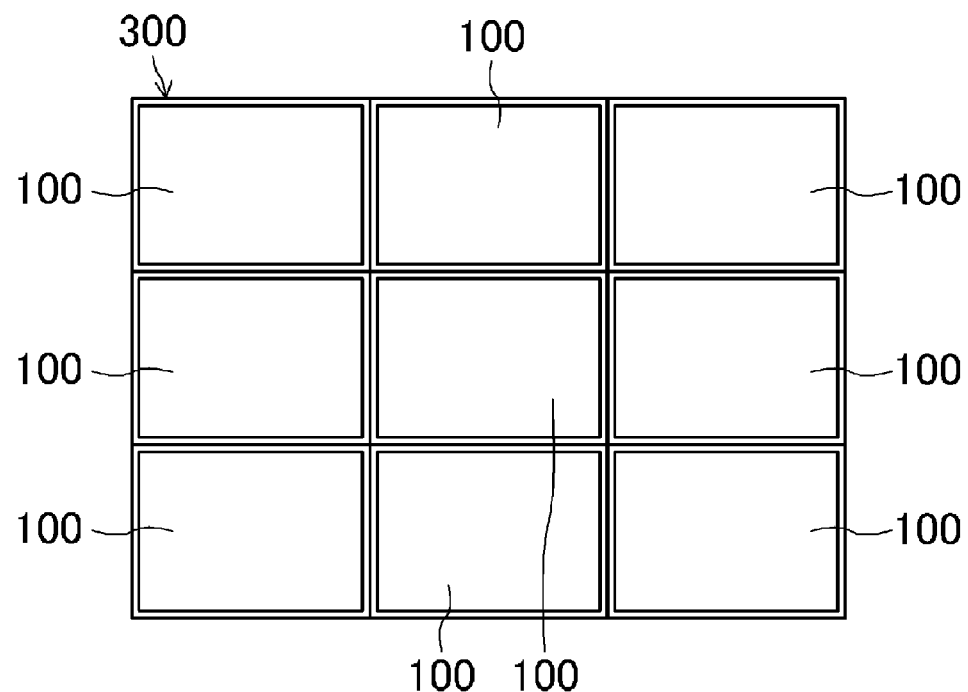
FIG. 2 is a view showing an assembled state of displays of the multi-display system.

FIG. 2 shows a state in which the plurality of display devices 100 have been integrally assembled. The plurality of display devices 100 altogether form a big-screen display 300. On the basis of instructions from the managing part 200, each of the display devices 100 may enlarge part of an image and then display the image so as to form a single image on the big-screen display 300. Each of the display devices 100 may also display the same image, without enlarging the image (basically, displaying nine images in tile shapes). Alternatively, each of the display devices 100 may also display a different image.

(Display Device)

The configuration of each of the display devices 100 will be explained below using FIGS. 3 and 4. The display device 100 has a display panel 110 that performs image display, a backlight unit 120 that radiates light on the display panel 110, a casing 130 in which the display panel 110 and the backlight unit 120 are arranged, a covering sheet 140 that covers and protects the surface display panel 110 on the viewing side, and a light guide member 150 provided at a periphery of the display panel 110.

The display panel 110 has two substrates 111A and 111B arranged opposing each other, a sealing member 112 that bonds these two substrates together provided in a frame shape on a periphery therebetween, a liquid crystal layer 113 provided in an area enclosed by the sealing member 112, and polarizing plates 114A and 114B provided on surfaces of opposite sides of the liquid crystal layer 113 of the substrates 111A and 111B, respectively. A display area D that performs image display, and a non-display area F surrounding the display area D are arranged on the display panel 110. It is preferable for the display panel 110 to have a diagonal length greater than or equal to 812 mm (32-inch size), and even more preferable for the size of the display panel 110 to be about 60 inches with the vertical length being 747 mm, and the horizontal length being 1328 mm, for example.

The backlight unit 120, although not shown, has a light source such as a cold-cathode fluorescent lamp or an LED (Light Emitting Diode), a light guide plate that guides light from the light source to the display panel 110, and a diffusion plate, for example. When the light guided by the light guide plate to the display panel 110 passes through the liquid crystal layer 113 via the substrate 111A, the orientation direction of the liquid crystal molecules adjusts the transmittance of the light, and a display can be viewed when the light is emitted from the substrate 111B on the viewing side.

The casing 130 includes a front casing part 130A that supports the display panel 110, and a back casing part 130B that supports the backlight unit 120, for example. The front casing part 130A is a frame-shaped casing with a window formed on the bottom. The display panel 110 and the covering sheet 140 provided integrally therewith are arranged inside the front casing part 130A, and from the outside of the front casing part 130A display images of the display panel 110 can be viewed from the window of the front casing part 130A via the covering sheet 140. The surface of the covering sheet 140 integrally provided with the display panel 110 has a frame-shaped spacer 131 formed alongside the periphery. The spacer 131 functions to prevent an adhesive agent 151 that bonds the light guide member 150 from falling into the module. The inside of the bottom of the front casing part 130A is arranged so as to abut the spacer 131, resulting in the display panel 110 and the covering sheet 140 being supported by the front casing part 130A.

The back casing part 130B has a rectangular box shape with a bottom, and the backlight unit 120 is arranged therein. The bottom of the backlight unit 120 is bonded to the bottom of the back casing part 130B, resulting in the backlight unit 120 being supported by the back casing part 130B. The inside of the side wall of the front casing part 130A abuts the exterior of the side wall of the back casing part 130B, and thus the front casing part 130A and the back casing part 130B are supported by each other.

The covering sheet 140 is laminated by using OCA tape 141, and is provided so as to cover the entire surface of the polarizing plate 114B of the display panel 110. The covering sheet 140 has a thickness of 0.1 to 1 mm, for example.

It is preferable for the covering sheet 140 and the OCA tape 141 to have a refractive index of 1.3 to 1.7, and it is even more preferable for the refractive index to be close to 1.5. The refractive index of the glass and the polarizing plate 114B that form the display panel 110 is around 1.5. Having the refractive index of these components be a value close to the refractive indices of the covering sheet 140 and the OCA tape 141 makes it possible to suppress light refraction on the boundary between the display panel 110 and the OCA tape 141 and the boundary between the OCA tape 141 and the covering sheet 140. An acrylic plate (refractive index of 1.49) or the like is an example of a material for such a covering sheet 140. A tape (refractive index of approximately 1.5) or the like made of an acrylic resin material is an example of a material for such an OCA tape 141.

The light guide member 150 is provided in a frame shape at the periphery of the display panel 110 on the viewing side. The light guide member 150 has a plano-convex lens shape that has a planar surface and a convex surface, the planar surface facing the display panel 110. The light guide member 150 is formed from a transparent insulating material such as an acrylic resin, for example. The light guide member 150 has a width of 10 to 100 mm and a thickness of 10 to 30 mm.

Figure 3:
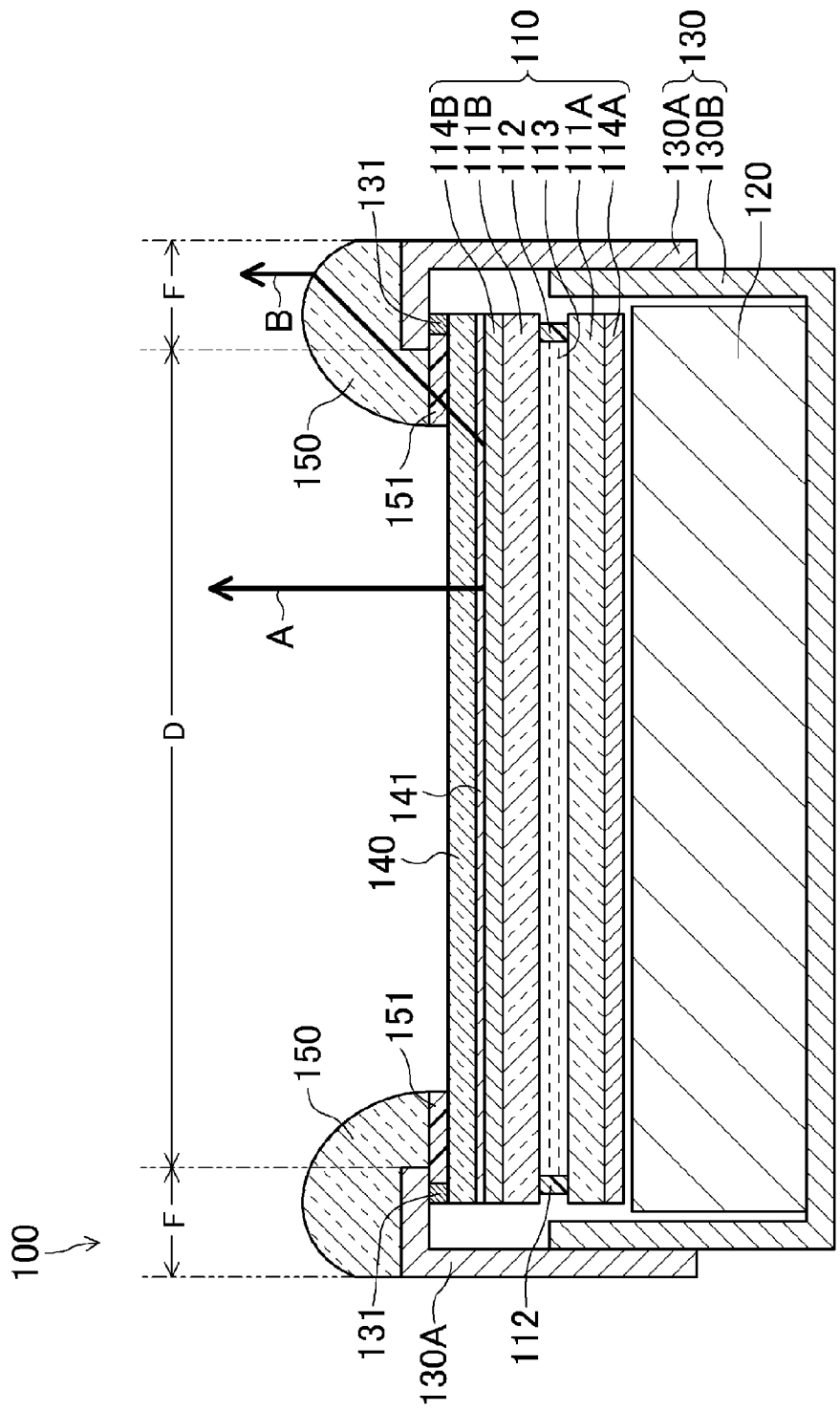
FIG. 3 is a cross-sectional view of a display device according to Embodiment 1.
Figure 4:
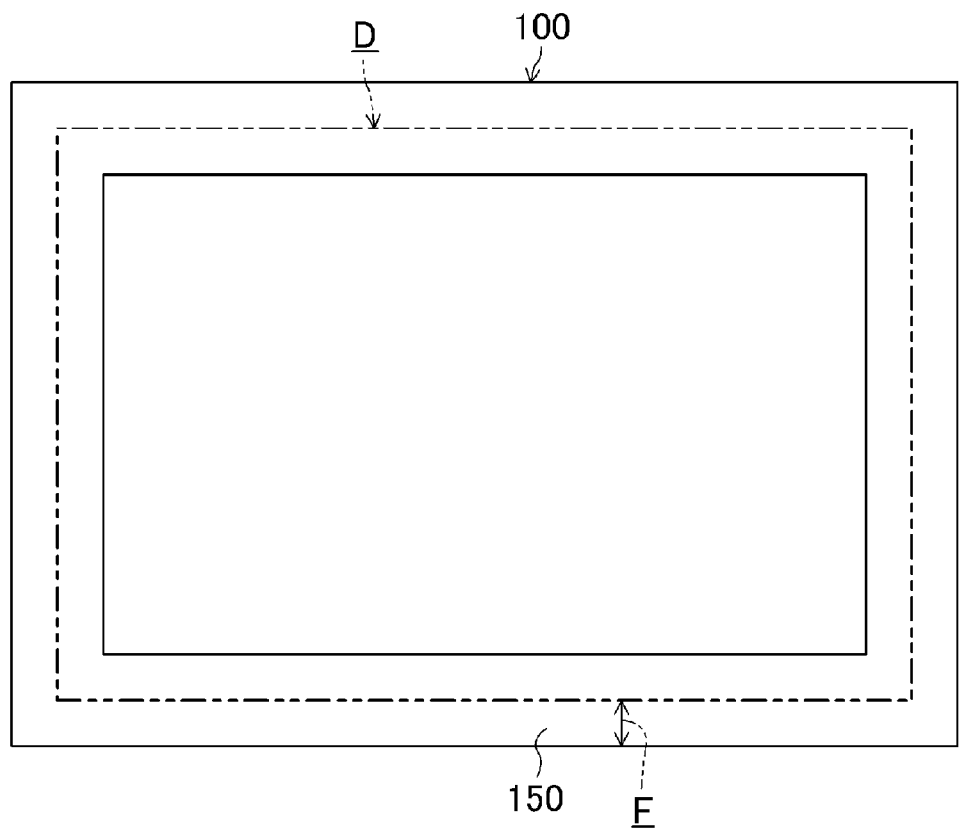
FIG. 4 is a schematic plan view of the display device according to Embodiment 1.

The light that performs image display on the display panel 110 is emitted perpendicularly to the display panel 110 in an area where the light guide member 150 is not provided, as shown by arrow A in FIG. 3. However, the light guide member 150 being provided in a frame shape at the periphery of the display panel 110 on the viewing side causes light on the periphery of the display panel 110 to refract on the convex surface of the light guide member 150 when the light passes through the light guide member 150, as shown by arrow B in FIG. 3. The light then progresses towards the outside of the display panel 110. Accordingly, the light that performs image display that hits the periphery is guided to outside the display panel 110, resulting in the seams of each of the display devices 100 being capable of being made harder to see when the display device 100 is used to form the big-screen display 300 from the multi-display system 10 where images are enlarged and displayed.

The light guide member 150 is bonded to the surface of the covering sheet 140 with the adhesive agent 151. An ultraviolet curable resin, a thermosetting resin, and the like are examples of the adhesive agent 151.

The covering sheet 140 being laminated by the OCA tape 141 was described above, but instead of the OCA tape 141 it is also possible to use an acrylic gel sheet (the "300Z" series made by Kyodo Giken Chemical Co., Ltd., for example) such as Molecule Gradient Layer Double Faced Adhesive Tape (registered trademark of Kyodo Giken Chemical Co., Ltd.).

(Method for Manufacturing Display Device)

Next, a method for manufacturing the display device 100 will be explained.

First, the display panel 110, the backlight unit 120, each of the casing parts 130A and 130B, the covering sheet 140, and the light guide member 150 are prepared. The display panel 110 is made using conventionally known methods. The backlight unit 120 is affixed to the back casing part 130B.

—Attachment of Covering Sheet 140—

Next, the covering sheet 140 is bent, and while using a roller to hold one end of the covering sheet 140, the covering sheet 140 is attached to the surface of the polarizing plate 114B by the OCA tape 141. At such a time, the covering sheet 140 is thin and can be easily bent, so by using the roller to hold one end of the covering sheet 140, the covering sheet 140 can be attached even with atmosphere present, while avoiding the occurrence of air bubbles between the polarizing plate 114B and the covering sheet 140. The attachment of the covering sheet 140 may be performed either before mounting or after mounting of mounting members such as SOF, but from the viewpoint of industrial convenience it is preferable to perform the mounting of the mounting members after the covering sheet 140 is attached. After the covering sheet 140 is attached, the frame-shaped spacer 131 is formed along the periphery on the surface of the covering sheet 140.

—Placement of Casing Part—

Next, the integrally provided display panel 110 and covering sheet 140 are bonded to the front casing part 130A so that the inside of the bottom of the front casing part 130A abuts the spacer 131.

—Bonding of Light Guide Member—

Next, the adhesive agent 151 is coated onto the periphery of the covering sheet 140, and the light guide member 150 is placed on top of that. Then, the adhesive agent 151A that has leaked from the light guide member 150 is wiped away. After that, the light guide member 150 is bonded by the adhesive agent 151 being hardened by ultraviolet irradiation and/or heating. If ultraviolet irradiation is used to harden the adhesive agent 151, then the ultraviolet irradiation may be performed while areas other than the light guide member 150 are masked. The entire surface of the display panel 110 on the viewing side is covered by the covering sheet 140, so the light guide member 150 is both bonded to the surface of the covering sheet 140 and is also in contact with the exterior surface of the bottom of the front casing part 130A. In FIG. 3, a state is shown where the light guide member 150 and the covering sheet 140 are bonded by the adhesive agent 151, but the adhesive agent 151 may also bond the light guide member 150 and the casing part 130A.

If the adhesive agent 151 leaks on areas other than those to be bonded to the light guide member 150 and covering sheet 140, then a solvent such as acetone is ultimately used to remove the leaked adhesive agent 151.

The display device 100 is made by doing the above.

Figure 5:
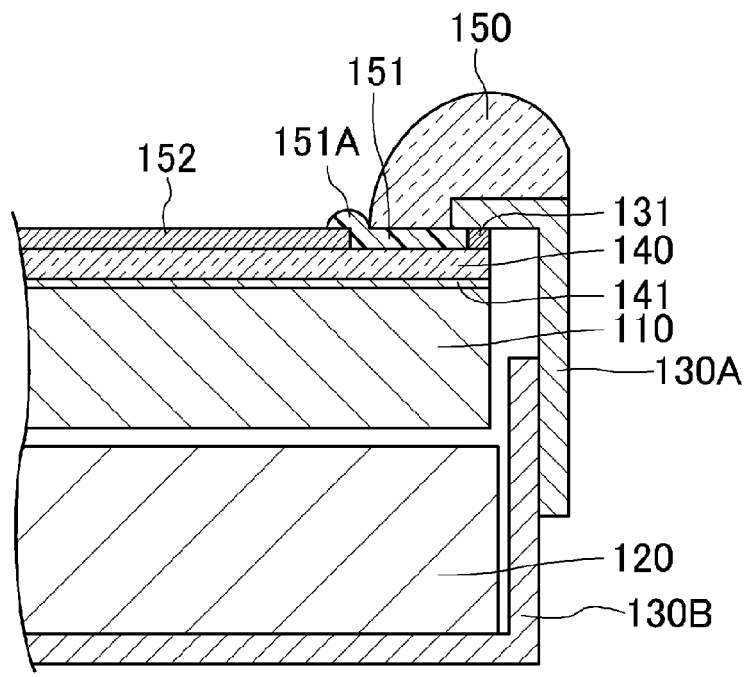
FIGS. 5($a$) and 5($b$) are views explaining a method for manufacturing the display device of Embodiment 1.
Figure 5:
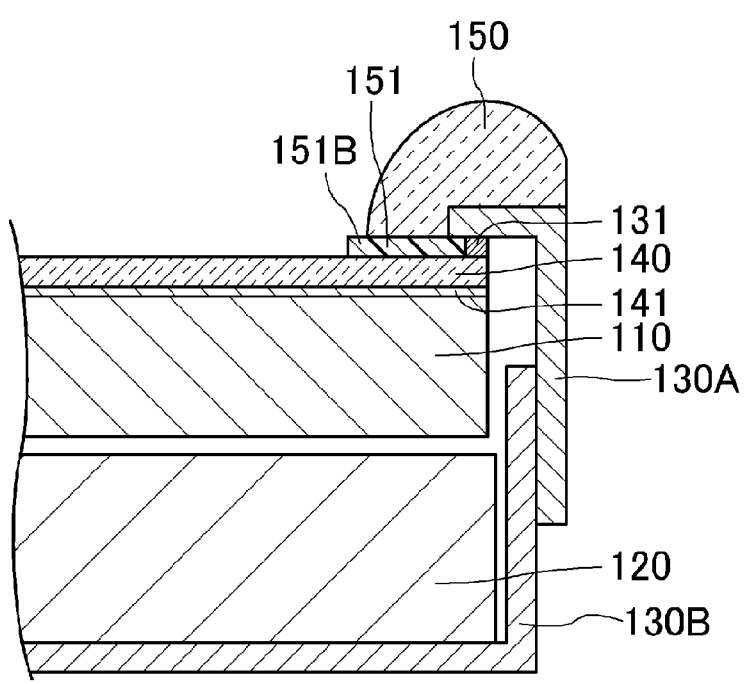

As shown in FIG. 5(a), during bonding of the light guide member 150 and before the coating of the adhesive agent 151, a cover film 152 may be provided on areas of the covering sheet 140 that are not to be coated by the adhesive agent 151 such that the adhesive agent 151 is made to not attach to the center of the covering sheet 140. In such a case, after the cover film 152 has been provided, the adhesive agent 151 is coated along the periphery of the covering sheet 140 and the light guide member 150 is bonded. In the end, the cover film 152 is removed. At this time, the leaked adhesive agent 151A is removed at the same time as the cover film 152. As shown in FIG. 5(b), a portion (151B) of the adhesive agent 151 may be left farther in on the covering sheet 140 than the light guide member 150.

(Effects of Embodiment 1)

According to Embodiment 1, the covering sheet 140 independent from the light guide member 150 is laminated on the polarizing plate 114B, so the covering sheet 140 can be attached to the polarizing plate 114B while being bent. Therefore, the occurrence of air bubbles between the covering sheet 140 and the polarizing plate 114B is suppressed, and as a result an excellent display quality can be obtained without deterioration of image display due to the air bubbles. The light guide member 150 is not attached to the surface of the polarizing plate 114B, but rather to the surface of the covering sheet 140 by the adhesive agent 151, so even if the adhesive agent 151 attaches to areas other than those to be bonded to the light guide member 150 and covering sheet 140, the excess adhesive agent 151 can be easily removed by a solvent such as acetone, which has harmful effects on the polarizing plate 114B, without the polarizing plate 114B being damaged by the adhesive agent 151, and without a deterioration of display quality.

Since the light guide member 150 is bonded to the surface of the covering sheet 140 by the adhesive agent 151, the light guide member 150 can also be removed once bonded.

The adhesive agent 151 may be a material that is capable of bonding to the covering sheet 140 but not to the polarizing plate 114B, so an adhesive agent (an ultraviolet curable resin, a thermosetting resin, and the like) can be used even if such an adhesive agent has harmful effects on polarizing plates.

Modification Example 1

Figure 6:
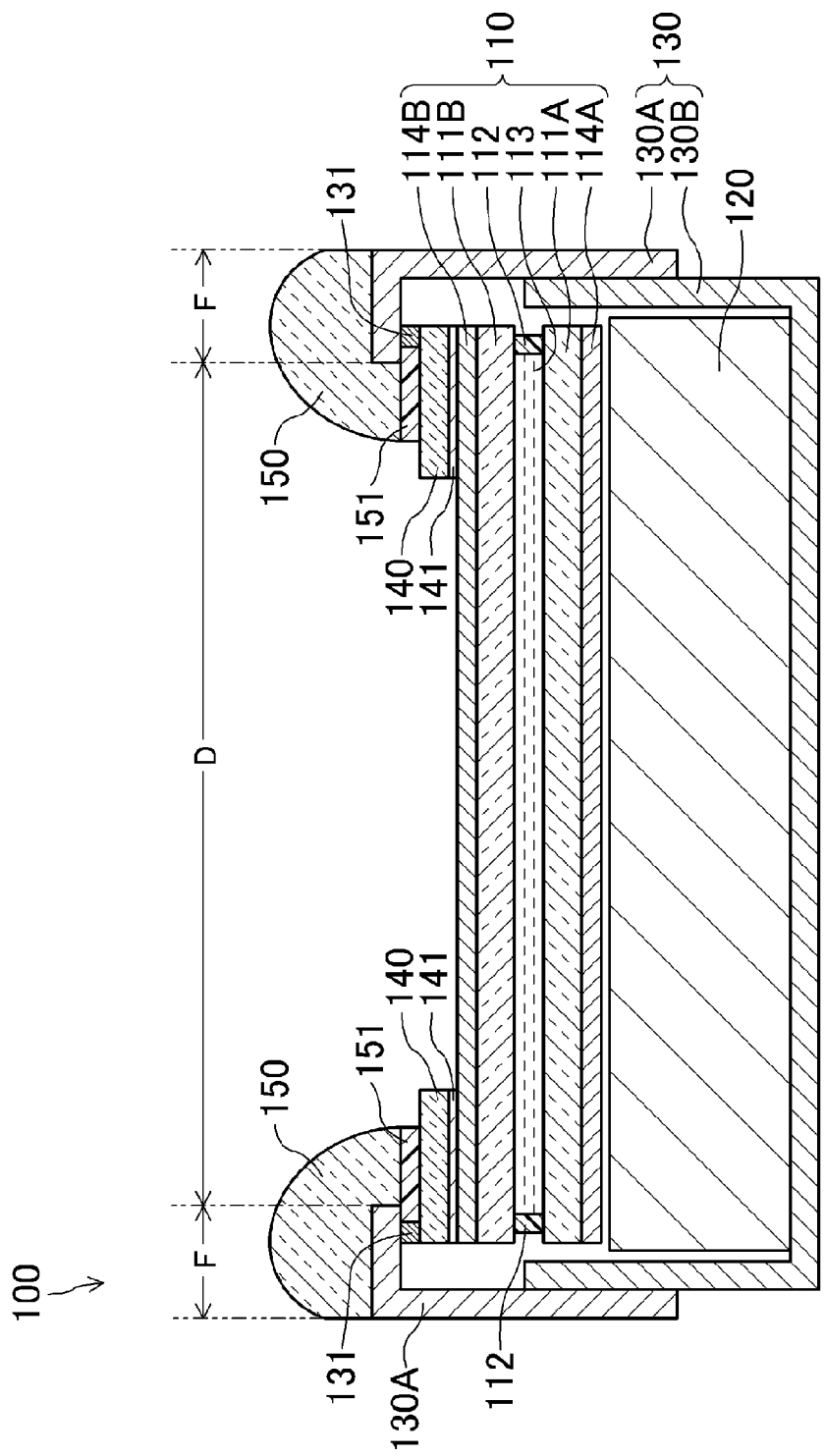
FIG. 6 is a schematic cross-sectional view of a display device according to Modification Example 1.
Figure 7:
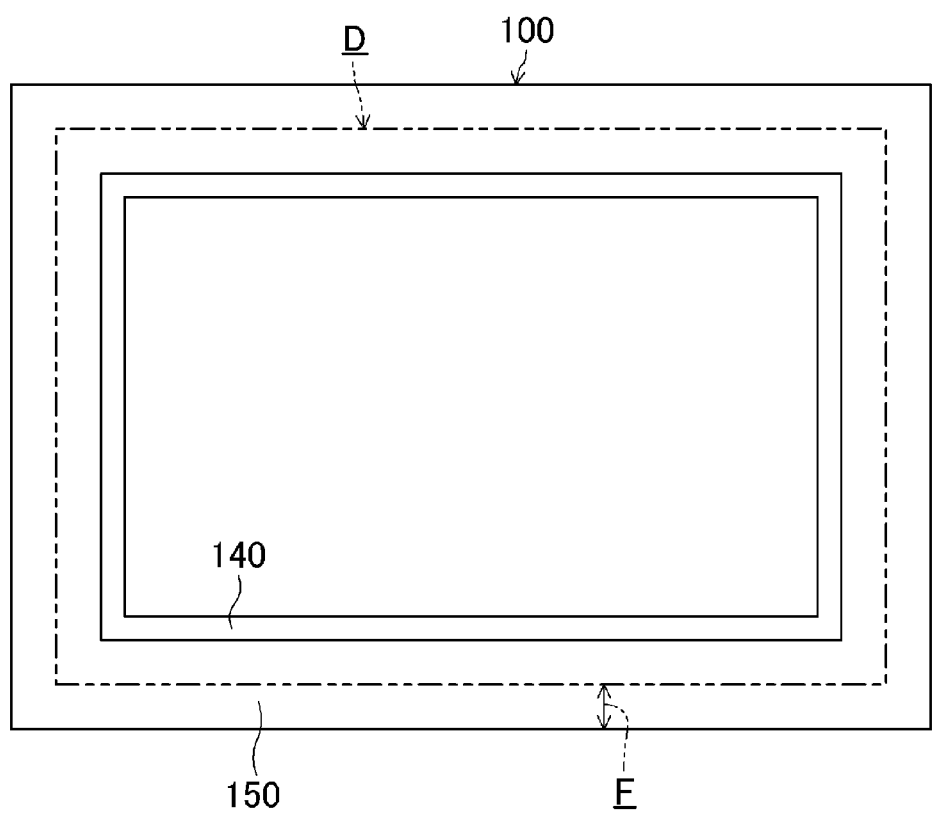
FIG. 7 is a schematic plan view of the display device according to Modification Example 1.

In Embodiment 1, the covering sheet 140 is provided so as to cover the entire surface of the display panel, but the covering sheet 140 may be provided so as to cover a portion of the display panel. As shown as Modification Example 1 in FIGS. 6 and 7, the covering sheet 140 may be laminated so as to cover the periphery of the polarizing plate 114B in a frame shape, for example. In this case, the covering sheet 140 is laminated between the light guide member 150 and the polarizing plate 114B. In other words, the covering sheet 140 must be provided on an area of the polarizing plate 114B where at least the light guide member 150 is provided.

According to Modification Example 1, the covering sheet 140 independent from the light guide member 150 is laminated on the polarizing plate 114B, so the covering sheet 140 can be attached to the polarizing plate 114B while being bent. Therefore, the occurrence of air bubbles between the covering sheet 140 and the polarizing plate 114B is suppressed, and as a result an excellent display quality can be obtained without deterioration of image quality due to the air bubbles. The light guide member 150 is not bonded to the surface of the polarizing 114B, but rather to the surface of the covering sheet 140 by the adhesive agent 151, so even if the adhesive agent 151 attaches to areas other than those to be bonded to the light guide member 150 and covering sheet 140, the excess adhesive agent 151 can be easily removed without the polarizing plate 114B being damaged by the adhesive agent 151, and without a deterioration of display quality.

Modification Example 2

In Embodiment 1, it is explained that the covering sheet 140 made of an acrylic plate is laminated by using the OCA tape 141, with the covering sheet 140 acting as a covering member that is provided on the polarizing plate of the display device, but a touch panel sheet 160 may also be provided as a covering member by using OCA tape 161.

The touch panel sheet 160 may be a resistive type, a capacitive type (an analogue capacitance coupling type), an ultrasonic type, or other types.

Figure 8:
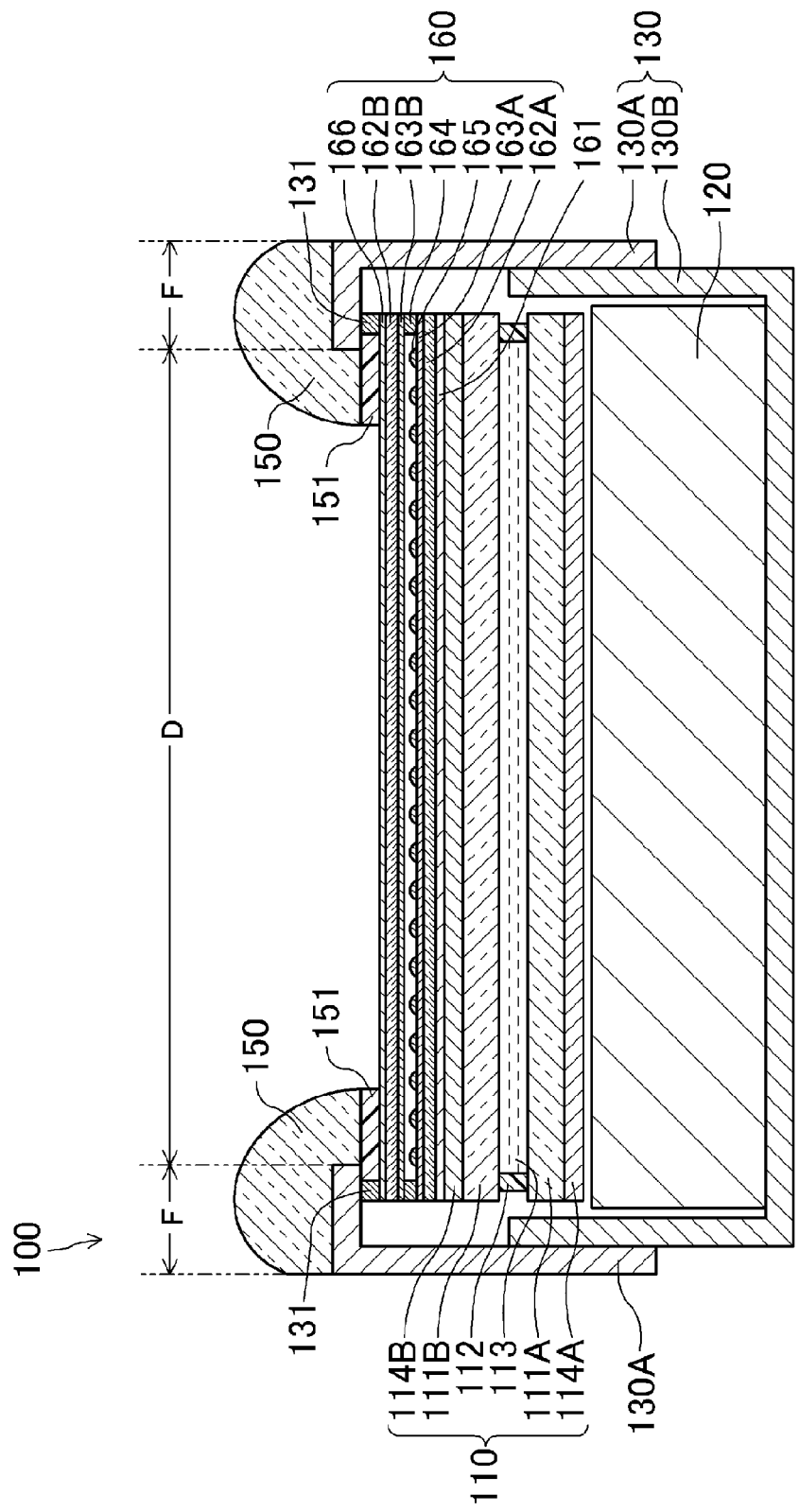
FIG. 8 is a schematic cross-sectional view of a display device according to Modification Example 2.
Figure 9:
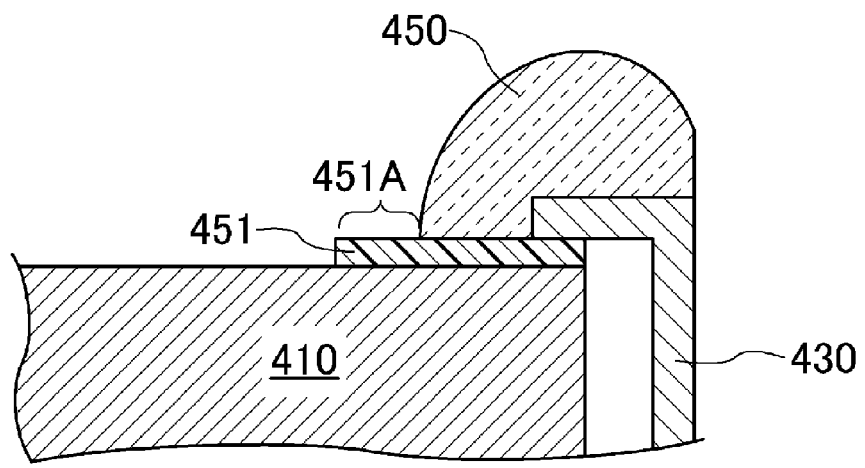
FIG. 9 is a view explaining problems during attachment of a light guide member in a conventional display device.
Figure 10:
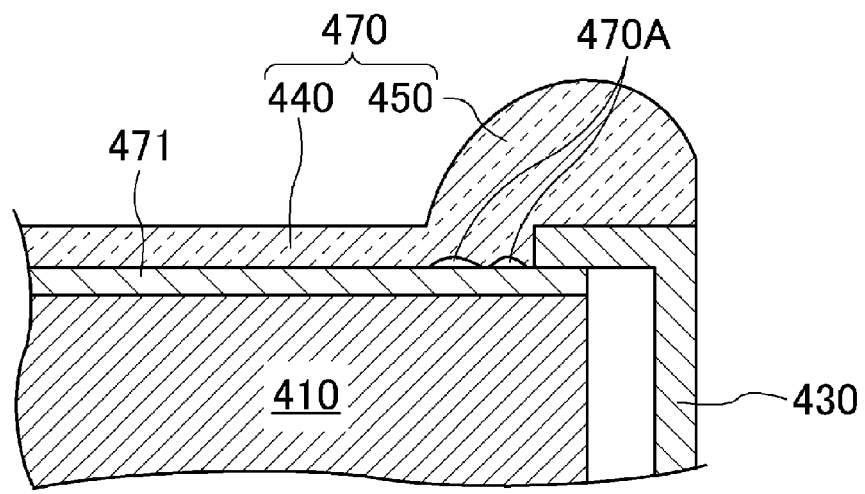
FIG. 10 is a view explaining problems during attachment of a light guide member in a conventional display device.

FIG. 8 is used below to explain a general configuration of the touch panel sheet 160 when the touch panel sheet 160 is a resistive type. The touch panel sheet 160 has a first base member made of a transparent conductive film 163A such as an ITO film being provided on the surface of a transparent film 162A, and a second base member made of a transparent conductive film 163B such as an ITO film being provided on the surface of a transparent film 162B. The first and second base members are arranged opposing each other so that the transparent conductive films 163A and 163B face each other. The first and second base members are bonded together by double-sided tape 164 provided on the periphery. Dot spacers 165 made of an epoxy resin or the like are provided at a prescribed pitch on the surface of the transparent conductive film 163A of the first base member, for example. A hard coating film 166 that is formed by coating and hardening a hard resin such as an acrylic urethane resin or a siloxane resin is provided on the surface of the PET film 162B of the second base member, for example.

A material with a refractive index of 1.3 to 1.7 can preferably be used for the transparent films 162A and 162B used as the base members for the touch panel sheet 160. This can lessen light refraction on the boundary of the display panel 110 and the transparent film 162A of the touch panel sheet 160, for example. For the material of such transparent films 162A and 162B, a PET (polyethylene terephthalate) film (refractive index of 1.58), a PEN (polyethylene naphthalate) film (refractive index of 1.64), a PC (polycarbonate) film (refractive index of 1.58), a glass film (refractive index of 1.5), or the like can be used, for example.

Other than using the touch panel sheet 160 as the covering member, Modification Example 2 has the same configuration as in Embodiment 1.

According to Modification Example 2, the touch panel sheet 160 can be attached to the polarizing plate 114B while being bent. Therefore, the occurrence of air bubbles between the touch panel sheet 160 and the polarizing plate 114B is suppressed, and as a result an excellent display quality can be obtained without deterioration of image display due to the air bubbles. The light guide member 150 is not bonded to the surface of the polarizing plate 114B, but rather to the surface of the hard coating film 166 of the touch panel sheet 160 by the adhesive agent 151. Therefore, even if the adhesive agent 151 attaches to areas besides those to be bonded to the light guide member 150 and the touch panel sheet 160, the excess adhesive agent 151 can be easily removed, the polarizing plate 114B will not be damaged by the adhesive agent 151, and there will be no deterioration of display quality.

Other Embodiments

The embodiment and modification examples described above explained the covering sheet 140 being bonded to the surface of the polarizing plate 114B via the OCA tape 141, but the covering sheet 140 and the polarizing plate 114B may also be bonded via an adhesive gel sheet such as an acrylic gel sheet or a urethane gel sheet.

The embodiment and modification examples described above showed technology relating to a liquid crystal display device as the display device 100, but without being limited thereto, the present invention may use an organic EL display device, an inorganic EL display device, an electrophoretic display device, a plasma display (PD), a plasma addressed liquid crystal display (PALC), a field emission display (FED), a surface-conduction electron-emitter display (SED), or the like, for example. The display device 100 may also have a drive system of the display panel 110 that is a field-sequential color type.

INDUSTRIAL APPLICABILITY

The present invention is useful for a display device, a multi-display system and a method for manufacturing the display device. More specifically, the present invention is useful for a display device for forming a multi-display display system where a light guide member is provided so as to make a frame portion (a seam between display regions of the multi-system display) unobtrusive, and useful for a multi-display system that the display device forms, and a method for manufacturing the display device.

DESCRIPTION OF REFERENCE CHARACTERS

10 multi-display system
100 display device
110 display panel
111A substrate
111B substrate
113 liquid crystal layer
114B polarizing plate
140 covering sheet (covering member)
141 OCA tape (optical clear adhesive tape)
150 light guide member
151 adhesive agent
160 touch panel sheet (covering member)
161 OCA tape (optical clear adhesive tape)

The invention claimed is:

1. A display device, comprising:
   a display panel;
   a light guide member provided in a frame shape at a periphery of the display panel on a viewing side, the light guide member guiding light that performs image display on the display panel to outside of the display panel; and
   a transparent sheet-shaped covering member laminated above a surface of the display panel on the viewing side so as to have a portion of the covering member positioned between the light guide member and the display panel,
   wherein the light guide member is bonded to a surface of the covering member by an adhesive agent, and
   wherein said covering member has a refractive index that substantially corresponds to a refractive index of an uppermost layer of the display panel so as to suppress refraction of light from the display panel.

2. The display device according to claim 1, wherein a polarizing plate is provided on an outermost surface of the display panel on the viewing side.

3. The display device according to claim 1, wherein the covering member is laminated so as to cover an entire surface of the display panel on the viewing side.

4. The display device according to claim 1, wherein the covering member is laminated in the frame shape so as to cover the periphery of the display panel surface on the viewing side.

5. The display device according to claim 1, wherein the covering member is made of a material having a refractive index of 1.3 to 1.7.

6. The display device according to claim 5, wherein the covering member is an acrylic plate.

7. The display device according to claim 1, wherein the covering member is a touch panel sheet.

8. The display device according to claim 1, wherein the covering member is laminated on the surface of the display panel on the viewing side by an optical clear adhesive tape.

9. The display device according to claim 8, wherein the optical clear adhesive tape has a refractive index of 1.3 to 1.7.

10. The display device according to claim 1, wherein the light guide member has a plano-convex lens that has a planar surface and a convex surface, the planar surface facing the display panel.

11. The display device according to claim 1, wherein the adhesive agent is an ultraviolet curable resin or a thermosetting resin.

12. The display device according to claim 1, wherein the display panel is a liquid crystal display panel having a liquid crystal layer provided between two substrates.

13. A multi-display system that combines a plurality of the display devices according to claim 1 to perform a big-screen display.

14. The display device according to claim 5, wherein the covering member has a refractive index of 1.5.

15. A method for manufacturing a display device having:
a display panel; and
a light guide member provided in a frame shape at a periphery of the display panel on a viewing side, the light guide member guiding light that performs image display on the display panel to outside of the display panel,
the method comprising:
laminating a transparent sheet-shaped covering member above a surface of the display panel on the viewing side so as to have a portion of the covering member positioned between the light guide member and the display panel; and
bonding the light guide member to a surface of the covering member by an adhesive agent,
wherein said covering member has a refractive index that substantially corresponds to a refractive index of an uppermost layer of the display panel so as to suppress refraction of light from the display panel.

16. The method for manufacturing the display device according to claim 15, wherein a polarizing plate is provided on an outermost surface of the display panel on the viewing side.

17. The method for manufacturing the display device according to claim 15, wherein the covering member is laminated so as to cover an entire surface of the display panel on the viewing side.

18. The method for manufacturing the display device according to claim 15, wherein the covering member is laminated in the frame shape so as to cover the periphery of the display panel surface on the viewing side.

19. The method for manufacturing the display device according to claim 15, wherein the covering member is made of a material having a refractive index of 1.3 to 1.7.

20. The method for manufacturing the display device according to claim 19, wherein the covering member is an acrylic plate.

21. The method for manufacturing the display device according to claim 15, wherein the covering member is a touch panel sheet.

22. The method for manufacturing the display device according to claim 15, wherein the covering member is laminated on the surface of the display panel on the viewing side by an optical clear adhesive tape.

23. The method for manufacturing the display device according to claim 22, wherein the optical clear adhesive tape has a refractive index of 1.3 to 1.7.

24. The method for manufacturing the display device according to claim 15, wherein the light guide member includes a plano-convex lens that has a planar surface and a convex surface, the planar surface facing the display panel.

25. The method for manufacturing the display device according to claim 15, wherein the adhesive agent is an ultraviolet curable resin or a thermosetting resin.

26. The method for manufacturing the display device according to claim 15, wherein the display panel is a liquid crystal display panel having a liquid crystal layer provided between two substrates.

27. The method for manufacturing the display device according to claim 19, wherein the covering member has a refractive index of 1.5.

* * * * *